Aug. 16, 1932.   J. MESSING   1,872,482
PROCESS OF BENDING LAMINATED SHEETS
Filed April 17, 1930   3 Sheets-Sheet 1
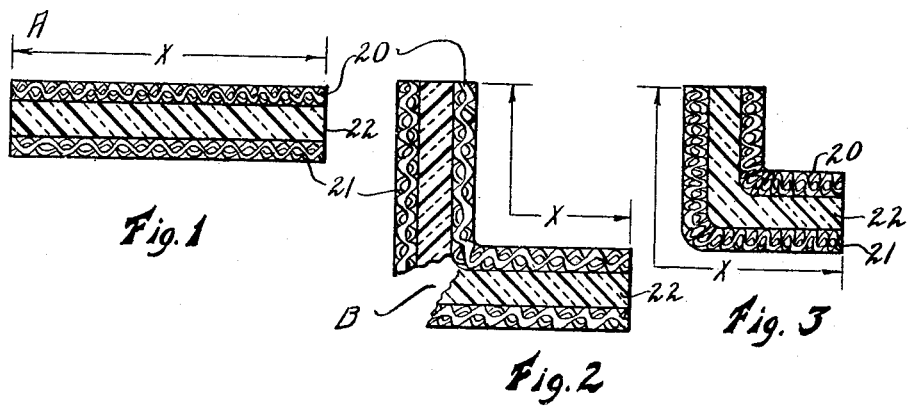
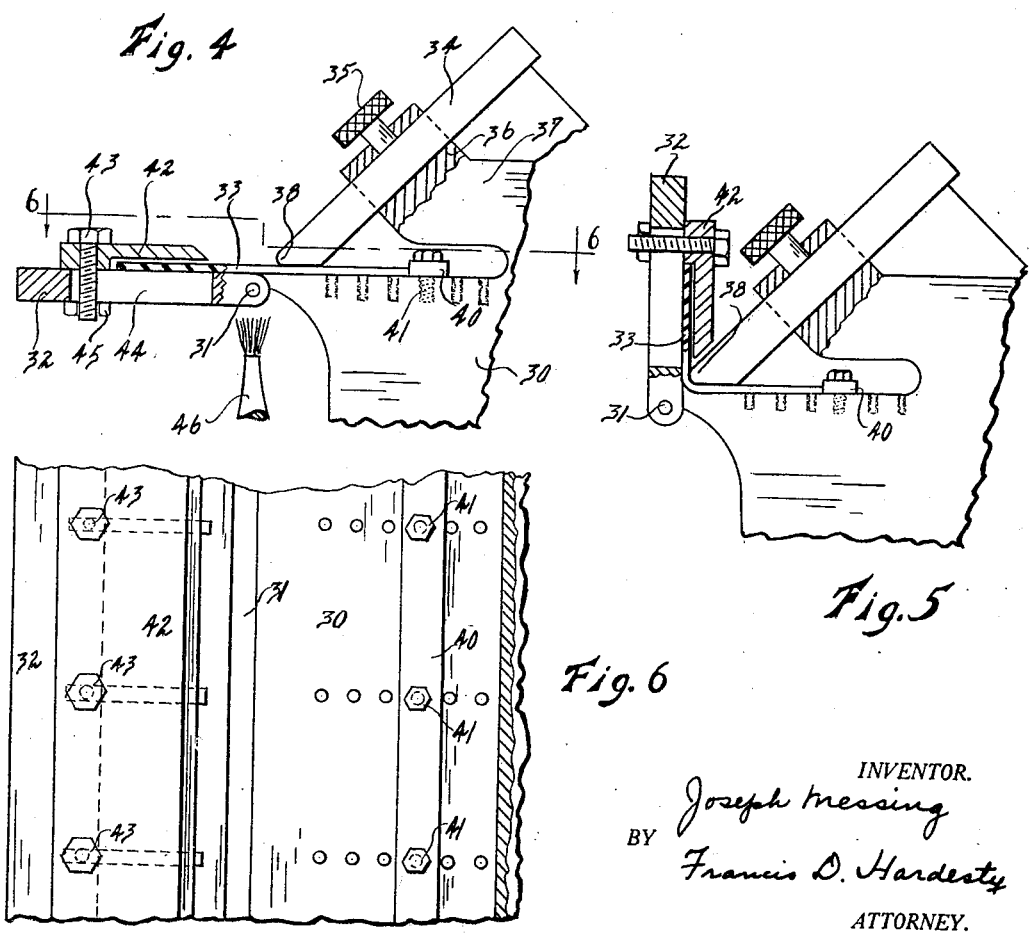
INVENTOR.
Joseph Messing
BY Francis D. Hardesty
ATTORNEY.

Aug. 16, 1932.  J. MESSING  1,872,482

PROCESS OF BENDING LAMINATED SHEETS

Filed April 17, 1930   3 Sheets-Sheet 2

INVENTOR.
BY Joseph Messing
Francis D. Hardesty
ATTORNEY.

Aug. 16, 1932.  J. MESSING  1,872,482
PROCESS OF BENDING LAMINATED SHEETS
Filed April 17, 1930  3 Sheets-Sheet 3

INVENTOR.
Joseph Messing
BY Francis D. Hardesty
ATTORNEY.

Patented Aug. 16, 1932

1,872,482

UNITED STATES PATENT OFFICE

JOSEPH MESSING, OF DETROIT, MICHIGAN, ASSIGNOR TO BULL DOG ELECTRIC PRODUCTS COMPANY, OF DETROIT, MICHIGAN, A CORPORATION OF WEST VIRGINIA

PROCESS OF BENDING LAMINATED SHEETS

Application filed April 17, 1930. Serial No. 445,106.

This invention relates to improvements in the art of bending certain non-metallic brittle materials.

It is the practice at present among electrical manufacturers to purchase rods, tubes and sheets of insulating material, such as vulcanized or hard rubber, formica, bakelite, compressed paper, fibre, etc., and to cut insulating members therefrom of the desired shape. At times, it becomes necessary to provide an insulating member having an irregular contour, one that is bent to small radius, and heretofore, since such pieces could not be cut from the sheets of material, they had to be die stamped or cast by the manufacturer of the material, at great expense and inconvenience to the electrical manufacturer.

It is an object of this invention, therefore, to provide a method or process by which certain electrically insulating parts could be made from a sheet of the insulating material, the process including the steps of cutting the part from the material and bending it to shape.

In the bending of such materials, however, it has been found that portions on the remote side of the line of bend are subjected to tensile stresses and that these portions were ruptured or weakened, since the material is of a class which can stand no tensile stresses.

It is also an object, therefore, of this invention to provide a process for bending such materials in which pressure is applied to the material during the bending to eliminate the possibility of tensile stresses arising therein.

It is a further object to provide apparatus for bending such materials, including bending or forming dies and portions other than the forming portions for imparting compression stresses to the material thru the plane thereof, the application of compression being continuous and being of such a character that tensile stresses therein are eliminated.

A further object is to provide a process for bending materials which cannot be heated beyond a certain point because of their tendency to "run", these materials, however, being capable of being heated up to a certain point to render them substantially flexible.

A further object is to provide a process and apparatus for forming "sharp" bends in such materials, as contrasted with bends of a large radius which present no difficulty.

Still other objects will readily occur to those skilled in the art upon reference to the following description and the accompanying drawings in which Fig. 1 shows, to greatly enlarged scale, a cross section of a three-ply material to be bent.

Fig. 2 shows the same material bent by old and well known processes.

Fig. 3 shows the material bent by the improved process of this invention.

Fig. 4 is a view of a machine for bending sheets of the material.

Fig. 5 is another view of the same.

Fig. 6 is a sectional view of Fig. 4 on the line 6—6, parts being removed for clarity.

Figure 7:
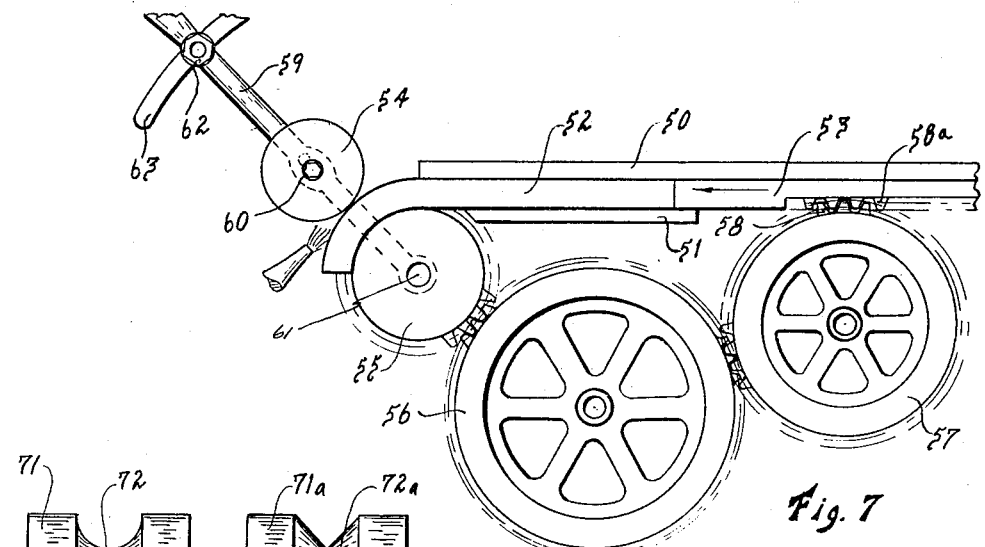
Fig. 7 is a view of another machine for carrying out the process of this invention.

Referring to the drawings, a portion of material comprising two layers of linen, cloth, etc., between which is a layer of a phenol condensation product is shown at A. The layers 20 and 21 are saturated both in their fibers and in their interstices with the product of layer 22. The width of the portion is indicated by the dimension line X.

When it is desired to bend the material, heat is applied thereto, rendering the same more or less flexible, the temperature being maintained below the "running" point of the phenol condensation product, and the material is then bent. If bent by certain old and well known processes the inner side of the bend retains the dimension X and the outer side of the bend becomes considerably larger than the dimension X due to tensioning of the material at the portion B and perhaps due to a rupture therein. If bent by the improved process of the present invention, the material will attain the shape of Fig. 3, the outer side of the bend retaining the dimension X and the inner side being compressed to a dimension considerably less than X, as will be observed.

It will be noted that the fibers of the outer side of the bend remain in their normal states while the fibers on the inner side are compressed, becoming considerably stronger than they were originally.

Apparatus

The process of the present invention can be carried out by apparatus disclosed in Figs. 4 to 16 inclusive, which apparatus forms a part of the invention.

Sheet bending

A stationary table 30 (Fig. 4) having pivotally attached thereto at the axis 31 a movable table 32 forms a bed upon which the material 33 is disposed. A die member 34 is held in a slot 35 in the extension 37 on the table 30 by means of a knurled set screw 35 to form an abutment at 38 around which the material is bent. A stationary adjustable stop bar 40 held in place by means of the bolts 41 comprises one of the compression members and a plate 42 adjustably held on the movable portion of the table 32 by means of the bolts 43 projecting thru the adjusting slots 44 and threaded into the nuts 45, forms the other of the compression members.

If desired, a series of burners, one of which is indicated at 46 may be provided on the machine of Fig. 4 to warm the material along the line of bending. However, any other means may be provided, if desired, to heat the material at this point.

In carrying out the process, first the material is heated slightly to render it flexible, then it is placed on the tables, which are in the position of Fig. 4; then it is clamped between the fixed stop 40 and the movable stop 42. Then, by means of suitable mechanism (not shown) the table 32 is swung to the position shown in Fig. 5, the movable stop 42 causing the material 33 to be compressed between it and the stop 40 while bending, as indicated in Fig. 5. It will be noted that the axis of bending indicated by the abutment 38 is at some distance from the axis of swing of the stop 42 and that, therefore, the stop 42 will cause the application of compression to the material in the plane thereof, after the material has been partially bent without compression.

Continuous bending

Figure 8:
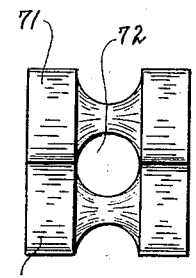
Figs. 8 and 9 show bending rolls.
Figure 9:
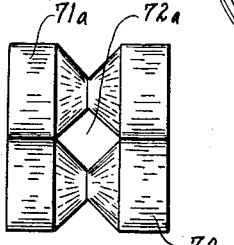

The process of the present invention can be utilized for the continuous bending of sheets, rods, etc., by means of the apparatus disclosed best in Figs. 7 to 9. Stationary guides 50 and 51 between which is disposed a sheet 52 of the material form a guide for the pusher plate 53 which is caused to constantly apply a compression force to the rear end of the material 52. The forward end of the latter is projected between the forming rolls 54 and 55 one of which, namely, roll 55, is driven by means of the driving wheel 56 which in turn drives the counterwheel 57 having teeth 58 engaging with similarly disposed teeth 58a on the pusher 53. Since the roll portion of the wheel 55 is slightly smaller in diameter than the pitch line of the gear teeth, it will be noted that the pusher travels at a slightly greater speed than the circumference of the roll 55 and accordingly constantly applies a compression force to the material 52.

If desired, roll 54 is made adjustable on the machine by means of the handle 59 attached to the roll 54 at 60 and to the machine at 61, the handle being provided with a nut and bolt device 62 riding in the slot 63. Movement of the handle 59 about the point 61 and in the slot 63 causes movement of the roll 54 from the position it is now shown as occupying.

Rod bending

If desired, the rolls disclosed in Figs. 8 and 9 may be substituted for the rolls 54 and 55 to bend rods instead of float sheets, the rolls 70, 70a, 71 and 71a being substituted for the rolls 54 and 55, the material being fed into a space 72, 72a to assume the shape of the latter.

Tube bending

Figure 10:
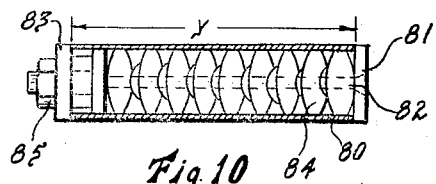
Fig. 10 is a view of a tube with a flexible mandrel therein.
Figure 11:
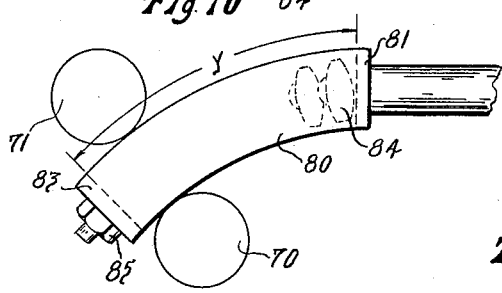
Fig. 11 is a view of the same in its bent position.
Figure 12:
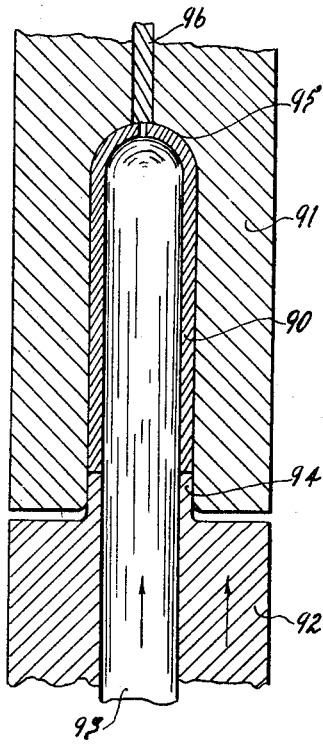
Fig. 12 is a view of an apparatus for closing the ends of tubes.
Figure 13:
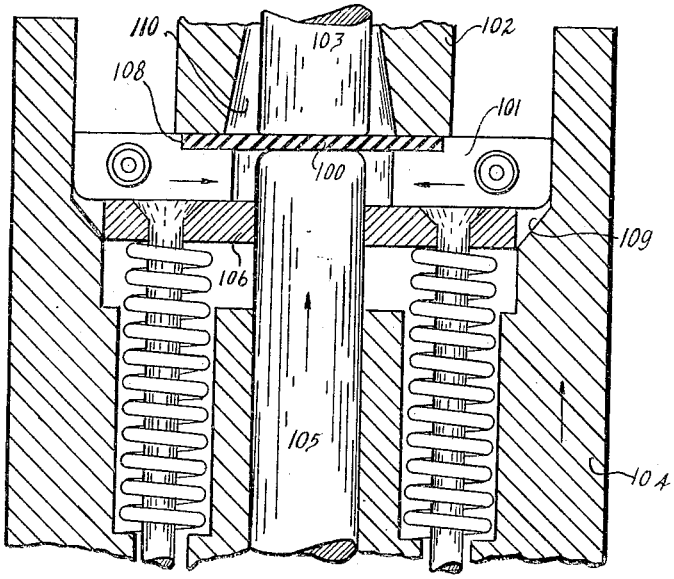
Figs. 13 and 14 show apparatus for forming cups by the process of the present invention.
Figure 14:
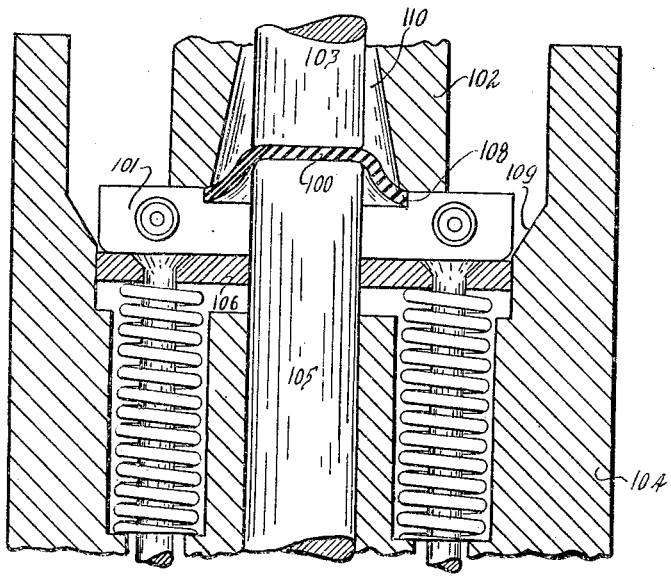
Figure 15:
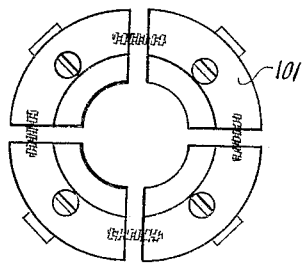
Figs. 15 and 16 show compression shoes for the apparatus of Figs. 13 and 14.
Figure 16:
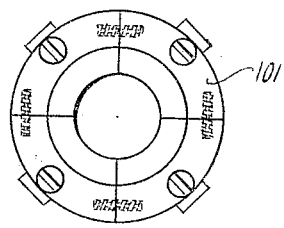

When it is desired to bend tubing by the improved process, the apparatus of Figs. 10 and 11 is used in connection with the apparatus of Figs. 7 and 9 inclusive. The tubing indicated at 80 is provided with a mandrel including a back or abutment portion 81 riveted to a flexible member 82 upon which is disposed an abutment 83, flexible elements 84, and a nut 85, the tube 80 being clamped between abutments 81 and 83 by drawing up the nut 85. The members 84, as disclosed in Figs. 10 and 11, are expansible and contractible, laterally and longitudinally, to take up the distance between the side walls of the tube and also between 81 and 83, that is to say, the distance Y and so as to form in effect, a solid rod which can be fed thru the rolls 70 and 71 in the manner described above. After the tube is bent the nut 85 is loosened which allows members 84 to contract to make it easy to withdraw the mandrel from the bent tube which carries out the process of the present invention.

Tube closing

When it is desired to close the ends of tubing by the process of the present invention, a tube 90 is inserted in the die 91 and plungers 92 and 93 are projected inwardly to abut the material. The plunger 93 first advances into die 91 to the position shown, then plunger 92 applies compression by means of extension 94 through the plane of the material against the cup bottom while the inner walls are forced around spherical shape end of 93 thus carrying out the process of the present invention. The usual "knock out" or ejector may be provided, if desired.

Cup forming

Figure 17:
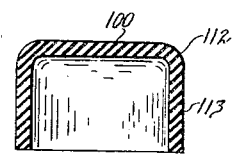
Fig. 17 shows a cup formed by the improved process.

The process of the present invention can be utilized in forming cups of the form disclosed in Fig. 17, by means of the apparatus of Figs. 13 to 16 inclusive. A disc 100 of the material is secured to the shoes 101 and under the dies 102 and 103. A compound plunger element having a shell 104 in which is a central plunger 105 and a shoe supporting means 106 forces the material against movable dies 102 and 103 in a manner which will be readily observed, the shoes 101 moving inwardly from the position shown in Figs. 13 to 15 to the position disclosed in Figs. 14 and 16, continuously applying compression at 108, movement of the shoes 101 being caused by the beveled portion 109 of the shell 104. Continued movement of the plunger 105 in the taper 110 of the die 102 causes the cup to change from the shape disclosed in Fig. 14 to the shape disclosed in Fig. 17, and in this further step it is not necessary to apply compression to the material since the latter is no longer being sharply bent on its curved portion 112, the side walls 113 of the latter being merely swung upon the line 112 as a pivotal line. However, if it is desired compression can be applied to the material by apparatus whose construction can be designed by the application of mere mechanical skill.

It will thus be observed that a process has been provided for forming electrically insulating members or parts from sheets, rods, tubes, etc., of the insulating material, and that apparatus has been provided for carrying out such process.

It will also be noted that a process for bending materials of the class above described, to very small radii, has been provided, a process which in no way injures the fibers of the material, and which does not weaken the material at the bending line.

If found necessary, a lubricant of suitable nature may be provided to prevent adhesion of the warmed material to the bending, rolling or forming dies.

Now having described the invention, and the preferred embodiment thereof, it is to be understood that the said invention is to be limited, not to the specific details herein set forth, but only by the scope of the claims which follow.

Claims:—

1. In the process of bending a sheet-like mass of a material which becomes flexible upon the application of heat, the steps of heating said material to a point to render it flexible, bending said material by stresses acting transverse to the plane of the sheet, and applying thereto, while it is being bent, pressure producing stresses acting in the plane of the sheet from opposite edges thereof.

2. In the process of bending a sheet-like mass of a material which becomes flexible upon the application of heat, and which cannot resist tension, the steps of heating said material to a point to render it flexible, bending said material by stresses acting transverse to the plane of the sheet, and applying thereto, while it is being bent, pressure producing stresses acting in the plane of the sheet from opposite edges thereof.

3. The process of bending material which becomes flexible at high temperatures and which cannot resist tensile stresses, which includes the steps of rendering said material flexible, applying forces to the material to bend it and simultaneously applying pressure thereto while it is being bent, in directions transverse to those of the forces used for bending, to prevent the arising of tensile stresses in the material.

4. For bending a non-metallic material of a type which becomes flexible at high temperatures and which cannot resist tensile stresses and which is brittle at ordinary temperatures, apparatus including means to render the material flexible, means to bend the material, and means to apply compression stresses to the material to prevent the arising of tensile stresses therewithin, said compression means being operable upon the material from opposed points and thru the plane of the latter and towards the bending points thereof.

5. For bending a non-metallic material of a type which becomes flexible at high temperatures and which cannot resist tensile stresses and which is brittle at ordinary temperatures, apparatus including means to render the material flexible, means to bend the material, and means to apply compression stresses to the material to prevent the arising of tensile stresses therewithin, said compression means being operable upon the material from opposed points thru the plane of the latter and towards the bending point thereof, resistance to said compression means being offered by the material being bent.

JOSEPH MESSING.